July 22, 1952  J. LIVINGSTONE  2,604,305
ROCK DRILL TIP
Filed Oct. 24, 1946
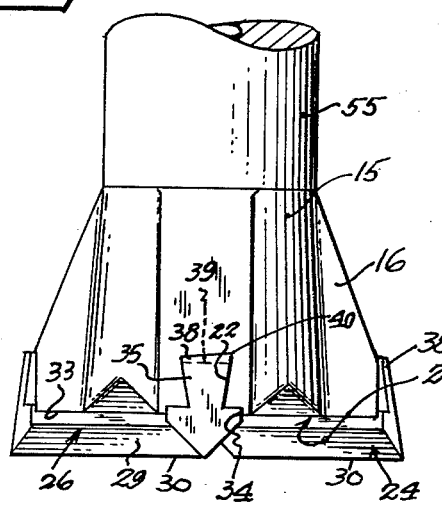
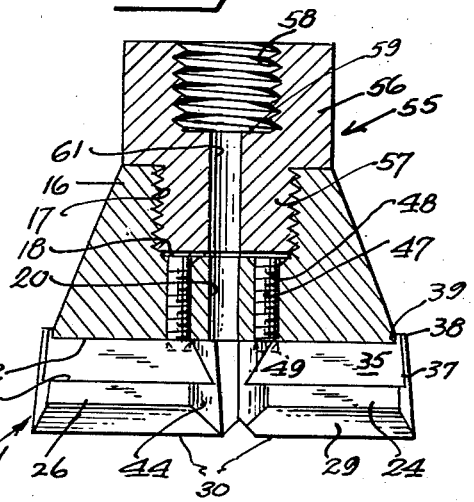
INVENTOR.
JAMES LIVINGSTON
BY George B White
ATTORNEY Patented July 22, 1952

2,604,305

UNITED STATES PATENT OFFICE 2,604,305

ROCK DRILL TIP

James Livingstone, San Francisco, Calif., assignor to Pearl Edith Livingstone, San Francisco, Calif.

Application October 24, 1946, Serial No. 705,386

4 Claims. (Cl. 255—64)

My invention relates to improvements in rock drills, and particularly to rock drill tips. An object of my invention is to provide a rock drill tip with a plurality of detachable drill bits, which are securely retained in a bit chuck and which may be readily replaced.

Another object of this invention is to provide new means for securing said drill bits to the bit chuck and to fix the position of each bit in relation to the bit chuck and to one another, and to provide retaining means, concealed in the bit chuck for securely holding said bits in place.

Another object of this invention is to provide abutments on the outer ends of the detachable bits to securely hold the bits aligned, said abutments being also adapted to be used for cutting a way out of the drilled hole while the drill is removed.

Another object of this invention is to provide a rock drill bit structure having a central passage for the flow of water or other cleaning fluid therethrough, and means for preventing the clogging of said water passage during the drilling operation.

Another object of this invention is to provide a rock drill tip having a plurality of detachable bits in the working end thereof, one of said bits extending over a part of the central fluid passage, so as to prevent the clogging of the latter by the substance through which the drill is being driven.

Another object of my invention is to provide a detachable drill bit having means in the outer end thereof for resisting the abrasive action of the substance through which the hole is being drilled.

Still another object of this invention is to provide an adapter by means of which the drill chuck with detachable bits, may be attached to drill rods of various types.

The essential features of the invention involved in the carrying out of the objects indicated are susceptible to modification, but a preferred embodiment of the invention is shown in the accompanying drawings, in which:

Fig. 1 is a side elevation of my rock drill chuck and bits.

Fig. 2 is a vertical cross section of the same showing the detachable bits in elevation.

Fig. 3 is a bottom view of the Fig. 1.

Fig. 4 is a top view of the drill chuck with the detachable bits.

Fig. 5 is a perspective view of a detachable bit.

Fig. 6 is another perspective view of the same bit.

Fig. 7 is a perspective view of another form of the detachable bit.

In general my rock drill tip or bit structure comprises a drill bit chuck, which carries a plurality of detachable bits in its working end.

My drill bit chuck is designed to hold the bits which cut the rock. It comprises a cylindrical body 15. Four vertical slanting wings 16 extend from said body 15 radially being equally spaced thereabout. The top of the chuck body 15 is bored and internally threaded at 17 to admit the external threads of the lower portion of a drill rod or an adapter hereinafter described. The bore 17 terminates with a bottom 18 from which a centrally located passageway 20 extends downwardly through said chuck.

The working end 21 of the chuck has four horizontal retaining grooves 22 which in this illustration are dovetailed radially extending from the central passageway 20. The grooves 22 carry drill bits 23, 24, 25 and 26. Each of the drill bits has a cutting portion which is substantially triangular in cross-section. A cutting edge 30 being formed as the apex of said triangle. The base 31 of said triangle is comparatively wide and covers practically all the bottom face 33 of the wing 16 and rests in a recess 34 provided in the latter. A dovetail lug 35 is formed on the bit base 31, which is adapted to fit snugly in said dovetail groove 22. The dovetail lug 35 extends through the entire length of the bit and has on its outer end 37 an abutment 38 protruding upwardly from the top 39 of said end 37. The latter extends beyond the outer periphery of the chuck body 15. The abutment 38 extends upwardly along the outer side of said body 15. The abutment 38 fixes the position of each bit and does not permit the bit to move inwardly during the cutting operation. The top of the abutment 38 is slanted transversely with respect to the top 39 of the dovetail lug 35, the purpose of which arrangement is to provide cutting edges on the periphery of the drill chuck body 15 which may be used when rotating the drill for extraction from the bore, if the latter should become clogged. In the latter case the drill is pulled upwardly and is rotated in a direction opposite to the direction in which the drill is turned during the drilling operation so that the raised corners 40 of said abutments will cut a path in the wall of the bore facilitating the withdrawal of the bit. In the present illustration for drilling the drill is rotated clockwise and for withdrawal counterclockwise.

The inner ends of said bits are adjacent to the center of the working end 21 of the chuck and are concave to form a passageway 43. Each of the three of said bits 23, 24 and 25 has a vertical groove 44 in said end substantially axial to the chuck body 15. The fourth bit 26 terminates with a sharp cutting point 45 protruding substantially to the vertical center line of said chuck body 15. This bit 26 performs a special function, namely, the point 45 cuts and grinds the rock formation which otherwise would enter the passageway 43 and clog the same. By arranging the point 45 over the center of said passageway, the danger of clogging the latter is eliminated.

The drill bits are held in place by screws 47 which extend from the bottom 18 of the bore 17 through the threaded holes 48 into the depressions 49 in the top 39 of the dovetail lugs 35. The screws 47 are concealed inside of the drill chuck body 15, and cannot be damaged during drilling operations but may be easily unscrewed for the purpose of replacing bits.

Although the drill bits are made of steel which is much harder than the body 15, the abrasive action of rock on the outer end walls of the bits is great. To reduce wear on the bit, a plug 50 made of especially hard metal may be inserted in the cutting end 37 of the drill bits which plug preferably extends parallel to the cutting edge 30. The plug 50 protrudes slightly beyond the drill bit and prevents the outer side wall of the latter from contacting the rock, through which the bore is being drilled.

For the purpose of attaching the drill bit chuck to any drill rod, I provide an adapter 55. It consists of a cylindrical body 56, the lower portion 57 of which is reduced in diameter and is externally threaded to fit into the threaded bore 17 of the chuck body 15. The body 56 is centrally bored at 58 to a certain depth which bore is internally threaded to fit a threaded end of a drill rod not shown. The bore 58 terminates with a bottom 59 against which the rod abuts when screwed into said bore 58. A centrally located passageway 61 leading from the bore 58 downwardly through said adapter is provided for passage of water or other fluid with which the drill is supplied through the passageway in a drill rod during the operation for the purpose of cleaning said drill. All adapters are of the same outside dimensions, the only difference being in the size and the threads of the bore 58, which is made to accommodate different types of drill rods.

I claim:

1. In a rock drill tip, drill tip chuck having an axial recess therein adapted to be engaged by a drill rod; a plurality of radially extended wings on the working end of said chuck, each of said wings having a groove in its tip radial to the center of said working end, a detachable bit slidably fitting into each groove, said chuck having a hole extended from the bottom of said recess to each groove, each bit having a depression in its top registering with said hole, and a concealed bit holding element releasably secured in each hole and projecting into the registering depression to hold the bit in its groove, the cutting point of one of the bits extending to the axial center of the working end of the chuck, the points of the other bits being formed into complemental channels to form an axial passage in said end of the chuck.

2. In a rock drill tip, a drill tip chuck having an axial recess therein adapted to be engaged by a drill rod, a plurality of radially extended wings on the working end of said chuck, each of said wings having a groove in its tip radial to the center of said working end, a detachable bit slidably fitting into each groove, said chuck having a hole extended from the bottom of said recess to each groove, each bit having a depression in its top registering with said hole, and a concealed bit holding element releasably secured in each hole and projecting into the registering depression to hold the bit in its groove, the cutting point of one of the bits extending to the axial center of the working end of the chuck, the points of the other bits being formed into complemental channels to form an axial passage in said end of the chuck, each bit comprising an elongated body, the cutting portion of said body being of substantially triangular cross section, the base of said triangular section being wider than the width of said groove, a cutting edge generally radial to said chuck formed by the apex of said triangle, and a longitudinal retaining element above said base slidably held in said groove.

3. In a rock drill tip, a drill bit chuck, a plurality of radially extending wings thereon, each of said wings having a groove in its tip radial to the center of the working end of the chuck, a detachable bit slidably fitting into each groove, a releasable element extended interiorly of the chuck and into each bit to hold the bit in its groove, the cutting point of one of the bits extending to the axial center of the chuck, the points of the other bits being formed into complemental channels to form a central passage for liquid therethrough, an abutment extended upwardly from the outer end of each bit and abutting the outer surface of said chuck to limit the inward motion of said bit, a cutting edge on the top of said abutment inclined transversely with respect of said bit and inclined away from the working end of the chuck in a direction opposite to the direction of rotation of said drill tip during drilling, the corners of said cutting edge farthest from the working end of said chuck forming cutting points when said drill bit is rotated in said opposite direction for withdrawal from a hole.

4. In a rock drill tip, a drill tip chuck having an axial recess therein adapted to be engaged by a drill rod, a plurality of radially extended wings on the working end of said chuck, each of said wings having a groove in its tip radial to the center of said working end, a detachable bit slidably fitting into each groove, said chuck having a hole extended from the bottom of said recess to each groove, each bit having a depression in its top registering with said hole, and a concealed bit holding element releasably secured in each hole and projecting into the registering depression to hold the bit in its groove, the cutting point of one of the bits extending to the axial center of the working end of the chuck, the points of the other bits being formed into complemental channels to form an axial passage in said end of the chuck, each bit comprising an elongated body, the cutting portion of said body being of substantially triangular cross section, the base of said triangular section being wider than the width of said groove, a cutting edge generally radial to said chuck formed by the apex of said triangle, and a longitudinal retaining element above said base slidably held in said groove, an abutment extended upwardly from the outer end of each bit and abutting the outer surface of said chuck to limit the inward motion of said bit, a cutting edge on the top of said abutment inclined transversely with respect of said bit and inclined away from the working end of the chuck in a direction opposite to the direction of rotation of said drill tip during drilling, the corners of said cutting edge farthest from the working end of said chuck forming cutting points when said drill bit is rotated in said opposite direction for withdrawal from a hole.

JAMES LIVINGSTONE.

REFERENCES CITED

The following references are of record in the file of this patent:

UNITED STATES PATENTS

| Number | Name | Date |
|---|---|---|
| 63,681 | White | Apr. 9, 1867 |
| 455,963 | Farrar | July 14, 1891 |
| 832,779 | Cushing | Oct. 9, 1906 |
| 923,514 | Hardsocg | June 1, 1909 |
| 1,384,629 | Overkamp | July 12, 1921 |
| 1,557,743 | Terrill | Oct. 20, 1925 |
| 1,873,814 | Brewster | Aug. 23, 1932 |
| 1,969,040 | Sanderson | Aug. 7, 1934 |
| 2,097,030 | Killgore | Oct. 26, 1937 |
| 2,101,376 | Voigtlander | Dec. 7, 1937 |
| 2,166,478 | Riblet | July 18, 1939 |
| 2,368,512 | Zimmerman | Jan. 30, 1945 |

FOREIGN PATENTS

| Number | Country | Date |
|---|---|---|
| 5,778 | Great Britain | Mar. 14, 1908 |
| 203,039 | Great Britain | Aug. 30, 1923 |
| 242,548 | Great Britain | Nov. 12, 1925 |